US011872804B2

(12) United States Patent
Jin

(10) Patent No.: US 11,872,804 B2
(45) Date of Patent: Jan. 16, 2024

(54) HOT STAMPING MACHINE

(71) Applicant: Weiguo Jin, Jiangsu (CN)

(72) Inventor: Weiguo Jin, Jiangsu (CN)

( * ) Notice: Subject to any disclaimer, the term of this patent is extended or adjusted under 35 U.S.C. 154(b) by 32 days.

(21) Appl. No.: 17/789,266

(22) PCT Filed: Nov. 24, 2020

(86) PCT No.: PCT/CN2020/131131
§ 371 (c)(1),
(2) Date: Jun. 27, 2022

(87) PCT Pub. No.: WO2021/147503
PCT Pub. Date: Jul. 29, 2021

(65) Prior Publication Data

US 2023/0049022 A1 Feb. 16, 2023

(30) Foreign Application Priority Data

Jan. 22, 2020 (CN) ......................... 202010073088.5

(51) Int. Cl.
*B41F 16/00* (2006.01)
*B41F 21/08* (2006.01)
*B41F 23/00* (2006.01)
*B41F 33/02* (2006.01)

(52) U.S. Cl.
CPC ............ *B41F 21/08* (2013.01); *B41F 16/008* (2013.01); *B41F 16/0046* (2013.01); *B41F 23/007* (2013.01); *B41F 33/02* (2013.01)

(58) Field of Classification Search
None
See application file for complete search history.

(56) References Cited

U.S. PATENT DOCUMENTS

2018/0243781 A1* 8/2018 Buerger .................. B44B 5/028

FOREIGN PATENT DOCUMENTS

CN 105667076 A 6/2016
CN 106142830 A 11/2016
CN 207889334 U 9/2018
(Continued)

OTHER PUBLICATIONS

International Search Report dated Feb. 23, 2021 for PCT/CN2020/131131.

*Primary Examiner* — Leslie J Evanisko
(74) *Attorney, Agent, or Firm* — Schmeiser, Olsen & Watts, LLP

(57) ABSTRACT

A hot stamping machine is provided, including a machine table, a processing platform, a hot stamping device and a license plate conveying device, wherein the hot stamping device includes an upper heating plate, a single-rod cylinder, a carbon ribbon and a carbon ribbon conveying mechanism; two groups of lifting mechanisms are used for driving lifting plates to move in the perpendicular direction, tops of two groups of grabbing devices are connected, and grabbing device moving mechanisms are used for driving the grabbing devices to move linearly between the two groups of lifting plates and the processing platform up and down and to the left and the right. Compared with an existing rolling hot stamping machine, the hot stamping machine does not require manual involvement in feeding and discharging, shortens the time for hot stamping one license plate by two-thirds, and has a high hot stamping efficiency.

10 Claims, 2 Drawing Sheets

(56) References Cited

FOREIGN PATENT DOCUMENTS

| | | | |
|---|---|---|---|
| CN | 208843366 | U | 5/2019 |
| CN | 111114111 | A | 5/2020 |
| CN | 211730636 | U | 10/2020 |
| DE | 102015208915 | B4 | 11/2016 |
| JP | H10286941 | A | 10/1998 |

* cited by examiner

HOT STAMPING MACHINE

CROSS-REFERENCE TO RELATED APPLICATIONS

This application claims priority to PCT Application No. PCT/CN2020/131131, having a filing date of Nov. 24, 2020, which is based on CN Application No. 202010073088.5, having a filing date of Jan. 22, 2020, the entire contents both of which are hereby incorporated by reference.

FIELD OF TECHNOLOGY

The following relates to the field of hot stamping of license plates, particularly to a hot stamping machine.

BACKGROUND

After license plates are formed, it is necessary to use a hot stamping machine to dye the raised words. Currently, rolling hot stamping is adopted in general for the words on license plates, at a low working efficiency.

SUMMARY

An aspect relates to a hot stamping machine, which does not require manual involvement in feeding and discharging and has a high hot stamping efficiency.

In order to achieve the foregoing technical aspect, embodiments of the present invention adopt the following technical solution:

A hot stamping machine, comprising:

a machine table;

a processing platform, arranged on the machine table, and connected to a processing platform lifting cylinder at the bottom of the processing platform;

a hot stamping device, comprising an upper heating plate, a single-rod cylinder, a carbon ribbon and a carbon ribbon conveying mechanism, wherein the upper heating plate is fixed above the processing platform, and the single-rod cylinder is connected behind the upper heating plate and pushes the upper heating plate to move horizontally; the carbon ribbon is arranged between the upper heating plate and the processing platform, and the carbon ribbon conveying mechanism is used for conveying the carbon ribbon; and a license plate conveying device, comprising two lifting plates, two groups of lifting mechanisms, two groups of grabbing devices and grabbing device moving mechanisms, wherein the two lifting plates are correspondingly arranged on two sides of the machine table and are used for placing license plates; the two groups of lifting mechanisms are used for driving the lifting plates to move in the perpendicular direction; the tops of the two groups of grabbing devices are connected, and the grabbing device moving mechanisms are used for driving the grabbing devices to move linearly between the two groups of lifting plates and the processing platform up and down and to the left and the right.

As a further improvement of embodiments of the present invention, each of the lifting mechanisms comprises a rotating nut ball screw, a bottom plate and limit rods; the limit rods surround a lifting plate and the bottoms of the limit rods are fixed to the bottom plate; a through hole is arranged in the middle of the bottom plate, internal threads are arranged inside the through hole, the top of the rotating nut ball screw is connected to the lifting plate, and the bottom of the rotating nut ball screw passes through the through hole, and is connected to the bottom plate in a threaded manner.

As a further improvement of embodiments of the present invention, the hot stamping machine further comprises a lower heating plate, and the lower heating plate is arranged below the processing platform and used for heating the processing platform. The pressing requires a certain temperature, while the license plate itself is cold. When the license plate contacts the upper heating plate, it will reduce the temperature of the upper heating plate, thereby resulting in a prolonged heating time. The lower heating plate provided in embodiments of the present invention can preheat the license plate in advance. When the preheated license plate contacts the upper heating plate, it will not affect the temperature of the upper heating plate, making the heating time shorter and the pressing faster.

As a further improvement of embodiments of the present invention, the grabbing devices are sucking discs. Further, each group of the grabbing devices includes at least one sucking disc.

As a further improvement of embodiments of the present invention, each of the grabbing device moving mechanisms comprises a synchronous wheel rotating motor, a synchronous wheel, a synchronous belt, a connection profile, lifting cylinders and a slide, the tops of the lifting cylinders are fixed to the connection profile and the bottoms of the lifting cylinders are connected to the grabbing devices and drive the grabbing devices to move perpendicularly; the connection profile is fixed to the synchronous belt by the slide, and the synchronous wheel rotating motor drives the synchronous wheel, which drives the synchronous belt to rotate, so that the grabbing devices move horizontally.

As a further improvement of embodiments of the present invention, the carbon ribbon conveying mechanism comprises a bull stick rotating motor and two bull sticks; the two bull sticks are correspondingly connected to two sides of the upper heating plate, and two ends of the carbon ribbon are wrapped around the bull sticks on the two sides; and one of the bull sticks is fixedly connected to an output shaft of the bull stick rotating motor.

As a further improvement of embodiments of the present invention, a suction opening is arranged on the processing platform and connected to a vacuum generator.

As a further improvement of embodiments of the present invention, a gravity sensor is arranged on the processing platform.

As a further improvement of embodiments of the present invention, a protective casing is arranged outside the hot stamping machine.

As a further improvement of embodiments of the present invention, the hot stamping machine further comprises a displayer, used for displaying the internal temperature and operating state of the hot stamping machine.

Compared with existing rolling hot stamping, the hot stamping machine provided by embodiments of the present invention does not require manual involvement in feeding and discharging, shortens the time for hot stamping one license plate by two-thirds, and has a high hot stamping efficiency.

BRIEF DESCRIPTION

Some of the embodiments will be described in detail, with references to the following Figures, wherein like designations denote like members, wherein.

In the figures: 1. machine table, 2. lifting plate, 31. upper heating plate, 32. lower heating plate, 4. single-rod cylinder, 5. grabbing device, 6. grabbing device moving mechanism, 7. carbon ribbon, 8. carbon ribbon conveying mechanism, 9. processing platform, 10. processing platform lifting cylinder, 11. protective casing, 12. displayer, 21. rotating nut ball screw, 22. bottom plate, 23. limit rod, 61. synchronous wheel rotating motor, 62. synchronous wheel, 63. synchronous belt, 64. connection profile, 65. lifting cylinder, 66. slide, 81. bull stick rotating motor, 82. bull stck.

DETAILED DESCRIPTION

Figure 1:
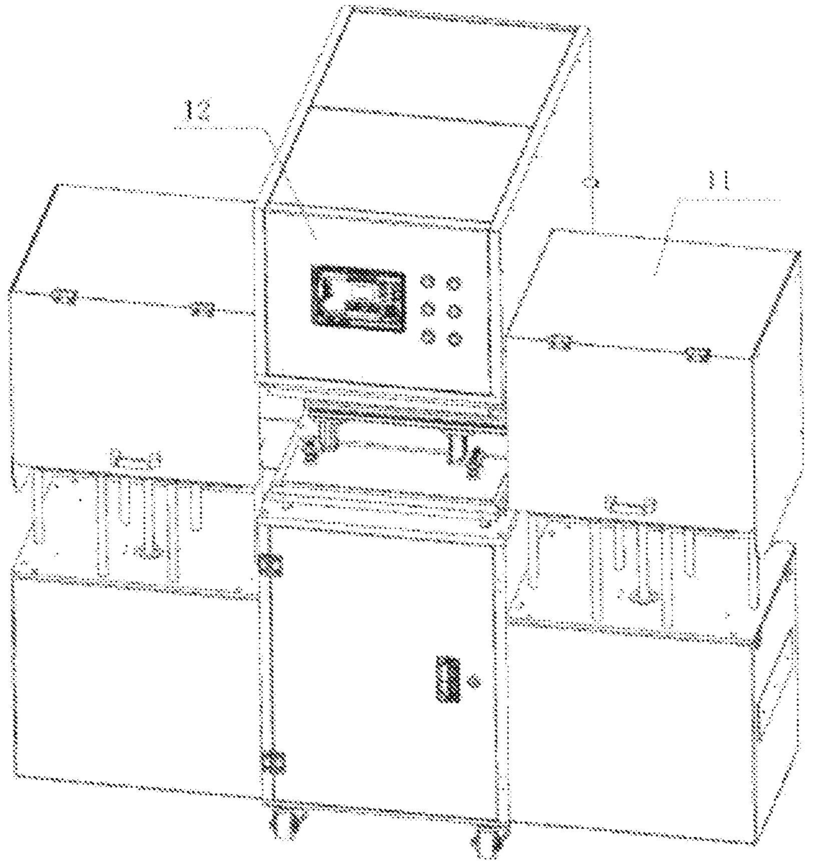
FIG. 1 is a schematic view of the external structure of a hot stamping machine.
Figure 2:
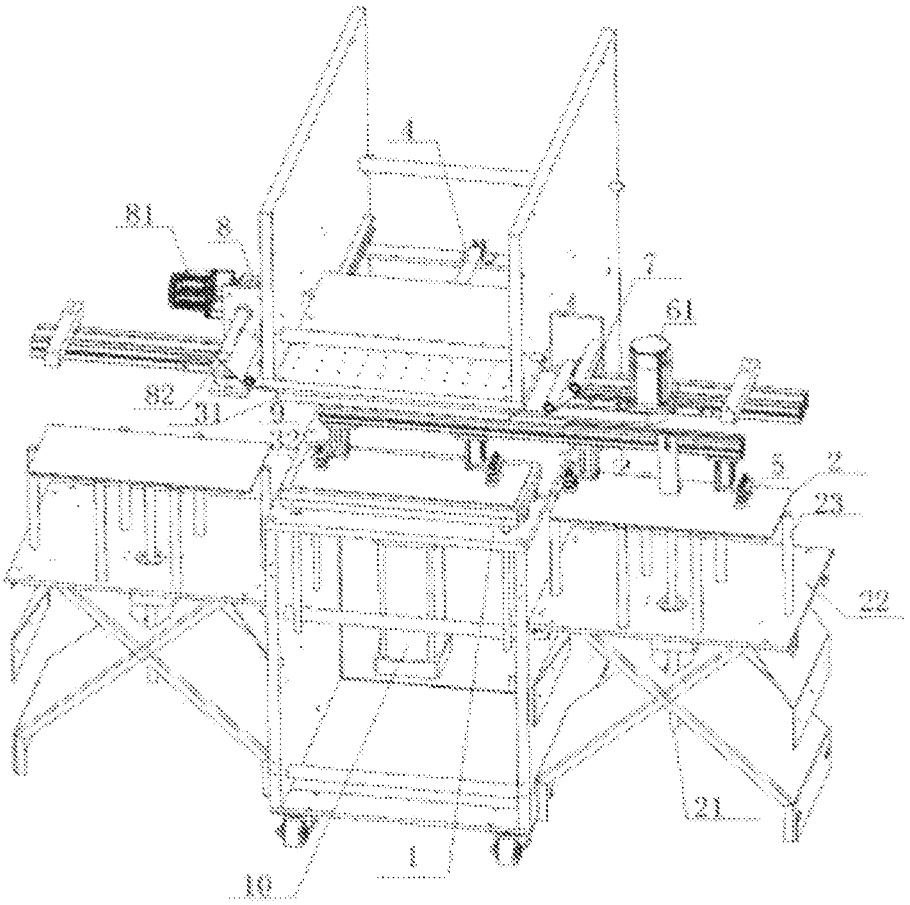
FIG. 2 is a stereoscopic view of the internal structure of the hot stamping machine.
Figure 3:
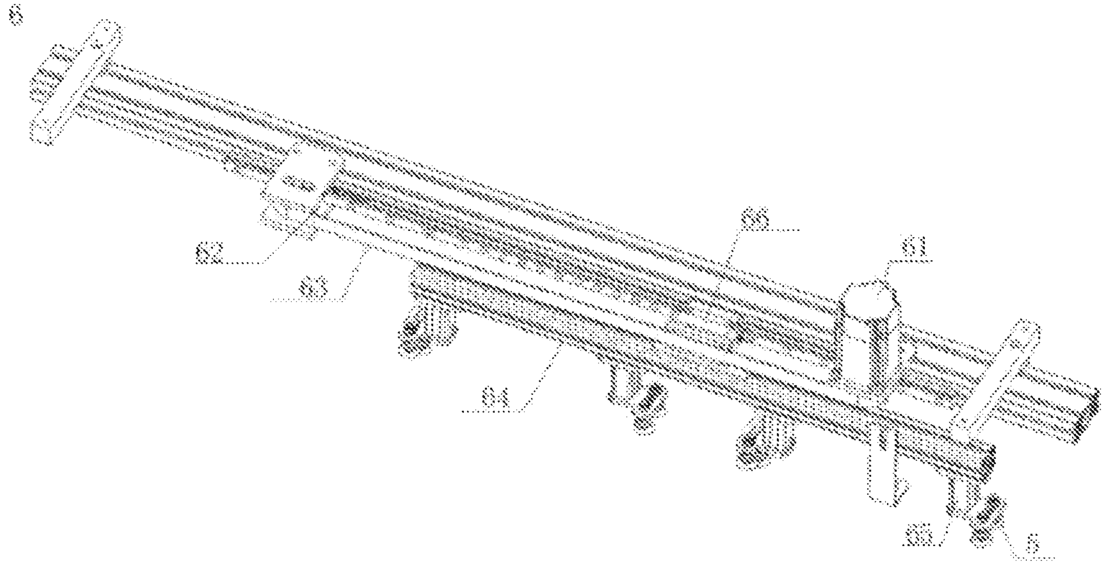
FIG. 3 is a structural schematic view of a grabbing device moving mechanism.

A hot stamping machine as shown in FIG. 1 to FIG. 3, comprising a machine table 1;

- a processing platform 9, arranged on the machine table 1, and connected to a processing platform lifting cylinder 10 at the bottom of the processing platform 9, wherein a limit device is arranged on the processing platform 9; a suction opening is arranged on the processing platform 9 and connected to a vacuum generator; and the processing platform lifting cylinder 10 is a supercharged cylinder;
- a hot stamping device, comprising an upper heating plate 31, a lower heating plate 32, a single-rod cylinder 4, a carbon ribbon 7 and a carbon ribbon conveying mechanism 8, wherein the upper heating plate 31 is fixed above the processing platform 9, and the single-rod cylinder 4 is connected behind the upper heating plate 31 and pushes the upper heating plate 31 to move horizontally; the lower heating plate 32 is arranged below the processing platform 9; the carbon ribbon 7 is arranged between the upper heating plate 31 and the processing platform 9, and the carbon ribbon conveying mechanism 8 is used for conveying the carbon ribbon 7; the carbon ribbon conveying mechanism 8 comprises a bull stick rotating motor 81 and two bull sticks 82; the two bull sticks 82 are correspondingly connected to two sides of the upper heating plate 31, and two ends of the carbon ribbon 7 are wrapped around the bull sticks 82 on the two sides; one of the bull sticks 82 is fixedly connected to an output shaft of the bull stick rotating motor 81; and a flat location of the carbon ribbon 7 is arranged between the upper heating plate 31 and a license plate on the processing platform 9;
- a license plate conveying device, comprising two lifting plates 2, two groups of lifting mechanisms, two groups of grabbing devices 5 and grabbing device moving mechanisms 6, wherein the two lifting plates 2 are correspondingly arranged on two sides of the machine table 1 and are used for placing license plates; each of the lifting mechanisms comprises a rotating nut ball screw 21, a bottom plate 22 and limit rods 23; the limit rods 23 surround a lifting plate 2 and the bottoms of the limit rods 23 are fixed to the bottom plate 22; a through hole is arranged in the middle of the bottom plate 22, internal threads are arranged inside the through hole, the top of the rotating nut ball screw 21 is connected to the lifting plate 2, and the bottom of the rotating nut ball screw 21 passes through the through hole and is connected to the bottom plate 22 in a threaded manner to drive the lifting plate 2 to move in the perpendicular direction; the tops of the two groups of grabbing devices 5 are connected, and the grabbing device moving mechanisms 6 are used for driving the grabbing devices 5 to move linearly between the two groups of lifting plates 2 and the processing platform 9 up and down and to the left and the right; each of the grabbing device moving mechanisms 6 comprises a synchronous wheel rotating motor 61, a synchronous wheel 62, a synchronous belt 63, a connection profile 64, lifting cylinders 65 and a slide 66, the tops of the lifting cylinders 65 are fixed to the connection profile 64, and the bottoms of the lifting cylinders 65 are connected to the grabbing devices 5 and drive the grabbing devices 5 to move perpendicularly; the connection profile 64 is fixed to the synchronous belt 63 by the slide 66, and the synchronous wheel rotating motor 61 drives the synchronous wheel 62, which drives the synchronous belt 63 to rotate, so that the grabbing devices 5 move horizontally;
- a protective casing 10, used for protection; and
- a displayer 11, used for displaying the internal temperature and operating state of the hot stamping machine.

The grabbing devices in this embodiment are sucking discs. Each group of the grabbing devices includes at least one sucking disc. Two sucking discs are provided in this embodiment.

An exemplary method for use of the hot stamping machine provided by embodiments of the present invention is as follows:

A license plate is placed on a lifting plate 2 on a side of the machine table 1. The grabbing device moving mechanism 6 drives a grabbing device 5 to grab the license plate on the lifting plate 2, then places the license plate on the processing platform 9 in the middle, and the grabbing device returns to the original position. The limit device of the processing platform 9 senses the license plate through pressure detection, the lower heating plate 32 is started to preheat the license plate, and the piston rod of the single-rod cylinder 4 pushes the upper heating plate 31 forward horizontally until the upper heating plate 31 moves over the license plate of the processing platform 8. The negative pressure suction of the suction opening on the processing platform 9 sucks the license plate.

Then the piston rod of the processing platform lifting cylinder 10 drives the processing platform 9 to move upwards until the carbon ribbon 7 is gripped between the license plate of the processing platform 9 and the upper heating plate 31. The carbon on the carbon ribbon 7 is transferred onto the raised words on the license plate, thereby achieving dyeing of the words.

After the dyeing, the processing platform 9 descends to the original position, and the upper heating plate 31 returns to the original position. Now, the grabbing device 5 comes and grabs the dyed license plate and puts the license plate to a lifting plate 2 on the other side. By repeating the above steps, the license plates stacked on the lifting plate 2 on a side can be gradually placed on the lifting plate 2 on the other side.

The operating method of the lifting mechanisms: Initially, the lifting plate 2 clings to the bottom plate 22. A stack of license plates are placed on the lifting plate 2. Sensors are installed at the upper limit position and lower limit position of the limit rods 23. When the upper limit sensor does not sense a license plate, the rotating nut ball screw 21 drives the lead screw to rise perpendicularly. The lead screw pushes up the lifting plate 2 until the top license plate among a stack of the license plates surpasses the limit rods 23, so that the top license plate can be grabbed away. By the above method, the license plates can be taken away one by one. Then the rotating nut ball screw 21 descends to the lower limit so that license plates are put in. The above work is repeated.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A hot stamping machine, wherein the hot stamping machine comprising:

a machine table;

a processing platform, arranged on the machine table, and connected to a processing platform lifting cylinder at the bottom of the processing platform;

a hot stamping device, comprising an upper heating plate, a single-rod cylinder, a carbon ribbon and a carbon ribbon conveying mechanism, wherein the upper heating plate is fixed above the processing platform, the single-rod cylinder is connected behind the upper heating plate and pushes the upper heating plate to move horizontally; the carbon ribbon is arranged between the upper heating plate and the processing platform, and the carbon ribbon conveying mechanism is used for conveying the carbon ribbon; and a license plate conveying device, comprising two lifting plates, two groups of lifting mechanisms, two groups of grabbing devices and grabbing device moving mechanisms, wherein the two lifting plates are correspondingly arranged on two sides of the machine table and are used for placing license plates; the two groups of lifting mechanisms are used for driving the lifting plates to move in the perpendicular direction; the tops of the two groups of grabbing devices are connected, and the grabbing device moving mechanisms are used for driving the grabbing devices to move linearly between the two groups of lifting plates and the processing platform up and down and to the left and the right.

2. The hot stamping machine according to claim 1, wherein each of the lifting mechanisms comprises a rotating nut ball screw a bottom plate and limit rods; the limit rods surround a lifting plate and the bottoms of the limit rods are fixed to the bottom plate; a through hole is arranged in the middle of the bottom plate, internal threads are arranged inside the through hole, the top of the rotating nut ball screw is connected to the lifting plate, and the bottom of the rotating nut ball screw passes through the through hole, and is connected to the bottom plate in a threaded manner.

3. The hot stamping machine according to claim 1, wherein the hot stamping machine further comprising a lower heating plate, and the lower heating plate is arranged below the processing platform and used for heating the processing platform.

4. The hot stamping machine according to claim 1, wherein the grabbing devices are sucking discs.

5. The hot stamping machine according to claim 4, wherein each group of the grabbing devices includes at least one sucking disc.

6. The hot stamping machine according to claim 1, wherein each of the grabbing device moving mechanisms comprising a synchronous wheel rotating motor, a synchronous wheel, a synchronous belt, a connection profile, lifting cylinders and a slide, the tops of the lifting cylinders are fixed to the connection profile and the bottoms of the lifting cylinders are connected to the grabbing devices and drive the grabbing devices to move perpendicularly; the connection profile is fixed to the synchronous belt by the slide, and the synchronous wheel rotating motor drives the synchronous wheel, which drives the synchronous belt to rotate, so that the grabbing devices move horizontally.

7. The hot stamping machine according to claim 1, wherein the carbon ribbon conveying mechanism comprising a bull stick rotating motor and two bull sticks; the two bull sticks are correspondingly connected to two sides of the upper heating plate, and two ends of the carbon ribbon are wrapped around the bull sticks on the two sides; and one of the bull sticks is fixedly connected to an output shaft of the bull stick rotating motor.

8. The hot stamping machine according to claim 1, wherein a suction opening is arranged on the processing platform and connected to a vacuum generator.

9. The hot stamping machine according to claim 1, wherein a protective casing is arranged outside the hot stamping machine.

10. The hot stamping machine according to claim 9, wherein the hot stamping machine further comprising a displayer, used for displaying the internal temperature and operating state of the hot stamping machine.

* * * * *